United States Patent

Perry

[11] Patent Number: 5,352,357
[45] Date of Patent: Oct. 4, 1994

[54] WASTE WATER TREATMENT SYSTEM

[76] Inventor: Cliff R. Perry, 934 S. 259th Pl., Federal Way, Wash. 98003

[21] Appl. No.: 20,300

[22] Filed: Feb. 18, 1993

[51] Int. Cl.$^5$ .................................................. C02F 3/30
[52] U.S. Cl. ........................... 210/150; 210/195.1; 210/261; 210/605; 210/903
[58] Field of Search ............... 210/150, 151, 195.1, 210/196, 202, 209, 255, 258, 259, 261, 605, 615, 748, 903, 192, 630; 422/46, 186.3; 250/436, 437, 438

[56] References Cited

U.S. PATENT DOCUMENTS

| | | | |
|---|---|---|---|
| 2,200,580 | 5/1940 | Prüss et al. | 210/150 |
| 2,382,010 | 8/1945 | Hodges | 210/615 |
| 2,788,127 | 4/1957 | Davidson | 210/605 |
| 3,231,490 | 1/1966 | Fry | 210/615 |
| 3,291,309 | 12/1966 | Hutchison | 210/151 |
| 3,371,033 | 2/1968 | Simmons et al. | 210/151 |
| 3,494,463 | 2/1970 | Vermette | 210/151 |
| 3,528,549 | 9/1970 | Ray | 210/151 |
| 3,789,986 | 2/1974 | Oldham et al. | 210/151 |
| 3,875,051 | 4/1975 | Kovarik | 210/605 |
| 4,005,010 | 1/1977 | Lunt | 210/615 |
| 4,477,394 | 10/1984 | Armstrong et al. | 210/150 |
| 4,581,143 | 4/1986 | Pepper, III | 210/630 |
| 4,749,493 | 6/1988 | Hicks | 210/150 |
| 4,798,702 | 1/1989 | Tucker | 210/748 |
| 4,800,021 | 1/1989 | Desbos | 210/150 |
| 4,895,645 | 1/1990 | Zorich, Jr. | 210/150 |
| 4,919,814 | 4/1990 | Carnahan et al. | 210/605 |
| 4,921,604 | 5/1990 | Moellenbeck | 210/620 |
| 4,968,437 | 11/1990 | Noll et al. | 210/748 |
| 5,156,742 | 10/1992 | Struewing | 210/151 |

*Primary Examiner*—Christopher Upton
*Attorney, Agent, or Firm*—Hughes, Multer & Schacht

[57] ABSTRACT

A biological waste treatment assembly used between a septic tank and a drain field. There is an upper chamber containing a trickle media bed for aerobic treatment of the effluent, and a sump positioned beneath this. The fresh effluent from the septic tank drains into the sump, and is drawn from this and pumped upwardly through a conduit by a submersible pump. Compressed air is introduced at the base of the conduit so as to aerate the effluent. The conduit is formed of UV-transparent tubing, and this is helically coiled around an ultraviolet light source which serves to destroy fecal colliform bacteria in the effluent. The effluent is then discharged via a spray nozzle onto the upper surface of the aerobic treatment bed, and migrates downwardly through this to a collection pan. A down tube drains the collected effluent directly to a relatively oxygen-free layer in the sump, where secondary anaerobic treatment serves to denitrify the products of the aerobic treatment in the upper chamber.

17 Claims, 6 Drawing Sheets

WASTE WATER TREATMENT SYSTEM

FIELD OF THE INVENTION

The present invention relates to the treatment of waste water containing organic contaminants, and, more particularly, to a method and apparatus for secondary aerobic and anaerobic biological treatment of a waste effluent discharged from a septic tank or the like.

BACKGROUND OF THE INVENTION

Septic tank systems are widely used in areas where municipal sewers are not available. In a typical installation, the waste water from a residence or commercial facility is directed into the septic tank, and here nonsoluble solids settle out of the flow (to be removed periodically when the tank is pumped out), while the suspended organic material undergoes anaerobic decomposition. Traditionally, the effluent from the septic tank then enters a drain field from which it is dispersed into the surrounding soil, with a certain amount of aerobic conversion taking place at this point. The waste water then migrates through the soil into the groundwater, or sometimes into adjacent surface water, such as a stream or lake.

Such traditional septic tank installations, although long utilized, exhibit several inherent limitations. Firstly, owing to the relatively inefficient manner in which aerobic treatment takes place in the drain field, this must be quite large, which is impractical in many instances; in fact, at many sites it is simply not possible to install a conventional drain field at all due to soil or topographical conditions. Also, large drain fields require significant excavation and a good deal of piping and other materials to install, and therefore involve high capital costs. Still further, conventional drain fields often become clogged and inoperative over a period of time, and if this happens, the capacity of the system may be greatly reduced.

One approach to overcoming these difficulties which has achieved considerable success involves the use of a secondary waste water treatment unit in which the effluent undergoes intensified aerobic processing before being discharged. An example of such a plant is the Model BP3 unit, available from Ekofinn Bioclere TM, 3020 South 96th Street, Tacoma, Wash. The present invention constitutes an improvement to systems of this type, and so an overview of such secondary waste water treatment plants will be provided here with reference to FIG. 1. As can be seen, the overall system 10 comprises generally a septic tank 12 and a secondary treatment unit 14. Septic tank 12 is of a conventional configuration, this having a main tank 16 which receives waste water from the dwelling via an inlet line 18. As was noted above, the solids settle out of the waste stream in tank 16, and an access cover 20 is provided for periodic removal of the accumulated materials. As was also noted above, initial biological treatment of the waste water takes place in tank 16, in the form of anaerobic decomposition. The septic tank effluent is then discharged via effluent line 22, this being a "clear" fluid relatively free of suspended solids.

Effluent line 22 (which would lead directly to a drain field in a traditional arrangement) carries the effluent into the secondary treatment unit 14. This comprises generally a lower sump portion 24 and an upper aerobic treatment portion 26, both of these being enclosed in a generally cylindrical assembly. The effluent is discharged into a central, open-ended baffle 28, from which it is withdrawn by a submersible pump 30. The discharge from this passes upwardly through a pressure tube 32 and is discharged on top of a conical distribution plate 34. The effluent flows out over this to the perimeter of the plate, from which it falls in streams to suspended sprayer plates 36. These are positioned immediately above the surface of trickling filter media bed 40, and they break up the streams and distribute them over the top of the bed. In some versions, the conical distribution plate may simply be provided with a multiplicity of perforations to distribute streams of the liquid onto the bed.

The filter media bed is typically made up of a random packed material, such as, for example, a multiplicity of small disc-shaped plastic elements having radial and annular ribs to provide increased surface area. As is known to those skilled in the art, bacterial colonies adhere to the surfaces of these elements, so as to form a biological slime which decomposes the organic components of the effluent as this flows through the media bed. Oxygen is required for the aerobic reactions which are carried out by the bacteria in the bed, and this is provided by means of a fan 42 which blows air into a chamber 44 over the bed 40.

When the aerobically treated effluent has migrated to the bottom of the bed, it drips from ports in the lower pan 46 of the treatment chamber and returns to the sump 24, simply falling onto the surface of the liquid in the sump, outboard of the central baffle 28. When the liquid in the sump reaches the level of outlet port 47, this flows out through overflow line 48 and is discharged; the biological oxygen demand (BOD) of the effluent thus having been greatly reduced by the secondary treatment unit, this can be safely discharged into a small or reduced capacity drain field, or sometimes directly into ground or surface waters.

While secondary treatment units of this type have proven highly successful in many respects, they are not without their limitations. The first of these stems from the difficulty in providing an adequate supply of oxygen to promote vigorous growth of the bacterial slime on the trickle medium. Common agents for providing this biological slime include the bacteria Pseudomonas, and these may be seeded into the medium to facilitate bringing the system on line. However, as these bacteria grow so that the biological slime increases in thickness, the innermost layers (i.e., those closest to the underlying substrate) become starved of nutrients and especially oxygen; eventually, the innermost layers die, and the material sloughs off of the substrate and is flushed into the sump. Eventually, the biological slime reestablishes itself on the now bare substrate, but this takes a period of time.

Because the slime coat is thus weakened by the relatively poor oxygen supply, it is not able to resist significant shear forces. As a result, it has been found that such conventional secondary treatment units cannot be operated on a continuous basis, since the effluent flow tends to wash away the bacterial slime coat and so impedes the operation of the device. These systems are therefore limited to operating on an intermittent or periodic basis, so as to provide "rest periods" for the biological slime coat, and this reduces the system capacity below that which it would have if it could be operated on a continuous basis. Also, because the pump is subjected to relatively high start-up loading during the repeated on/off cycles, its energy usage is excessive, and it also must be somewhat larger and more expensive than would be needed if the pump could operate continuously. Also the cyclical loading subjects the pump to excessive wear.

Another limitation which is associated with such conventional secondary treatments units is that even if complete aerobic decomposition is successfully carried out, the effluent from the unit is still not ideally conditioned for discharge. The effluent from the primary treatment septic tank is rich is toxic ammonium ($NH_3$); this is converted by the aerobic activity in bed 40, first to nitrites ($-NO_2$), and then to nitrates ($-NO_3$). While the nitrates are non-toxic, they present a pollution problem if discharged directly into the environment; for example, they act as a "fertilizer" to promote algae blooms and the like if they enter surface waters.

The nitrates are capable of being converted by biological activity to water and elemental nitrogen ($N_2$), which can be safely discharged without environmental consequence, but this requires another anaerobic metabolic step. However, since the nitrate-rich effluent which drips from bed 40 into the sump 24 tends to cycle within a relatively oxygenated surface zone until it is ultimately discharged through the overflow line, little or no such anaerobic activity can take place, and so the discharge is likely to contain a high nitrate content.

Yet another limitation which is exhibited by such conventional secondary treatment units is that they do not address the problem of bacterial contamination of the effluent. The fecal colliform bacteria content of the effluent entering the secondary treatment unit from the septic tank tends to be very high, and in many instances, this presents a serious health hazard if it is discharged directly into the environment. Attempts have been made to deal with this by installing a separate sterilization facility downstream of the treatment unit, but this is obviously a complex and costly solution, and so is usually feasible only for relatively large installations.

Accordingly, there exists a need for a secondary treatment unit which provides for a more effective supply of oxygen to the biological slime on the trickle media so as to promote more vigorous growth and efficient aerobic action thereof. Furthermore, there exists a need for a such a unit which provides an effective anaerobic treatment phase for the material which has passed through the aerobic biological treatment provided by the trickle media bed. Still further, there is a need for such a unit which effectively sterilizes the effluent so as to minimize the fecal colliform content of the discharge from the unit.

SUMMARY OF THE INVENTION

The present invention has solved the problems cited above, and is a biological waste treatment assembly for use between a septic tank and drain field. Broadly, this comprises an upper bed portion for aerobic biological treatment of an effluent from the septic tank, a lower sump portion for holding the effluent in a reservoir, this having a lower, relatively oxygen-free layer, and pump means for delivering a flow of the effluent to an upper portion of the bed so that the effluent migrates through the bed portion and undergoes aerobic biological treatment therein. Means are provided for collecting the effluent which has migrated through the aerobic bed portion of the assembly, and for draining this from the bed portion directly to the oxygen-free lower layer of the reservoir so that the effluent undergoes anaerobic biological treatment therein.

Preferably, the means for collecting the effluent may comprise a drain pan which is mounted beneath the upper bed portion of the assembly so as to receive the effluent which has migrated downwardly therethrough, and the means for draining the effluent to the oxygen-free lower layer of the reservoir may comprise a drain conduit having an upper end in fluid communication with this drain pan and a lower end in fluid communication with the lower, oxygen-free layer of the reservoir. Means are also preferably provided for discharging the effluent from the reservoir after this has undergone at least one cycle through aerobic treatment in the upper bed portion of the assembly and anaerobic treatment in the reservoir of the assembly.

The assembly may further comprise means for aerating the flow of effluent from the pump means prior to this flow entering the aerobic upper bed portion of the assembly. The means for delivering the flow of effluent to the bed may comprise a pump for drawing the effluent from the reservoir in the sump and a conduit for conveying the flow from the pump to the upper portion of the bed, and in this case, the means for aerating the flow of effluent may preferably comprise means for injecting air into the conduit so as to aerate the effluent therein. This means for injecting air may comprise an air pump, and an air line having an inlet end connected to the air pump and an outlet end connected to the effluent conduit. Preferably, this air line may be connected to the conduit closely adjacent the pump, so that the air diffuses into the effluent over substantially the entire length of the conduit.

The means for aerating the flow of effluent may further comprise an air chamber formed above the aerobic upper bed portion of the assembly, and the spray nozzle assembly which is connected to the conduit for discharging the flow of effluent in a spray through the air chamber, so that the effluent receives additional aeration therein prior to falling onto the bed. The spray nozzle assembly may comprise a single spray nozzle mounted to an upper end of the effluent conduit. Alternatively, this may comprise a distribution bowl which is mounted to the upper end of the conduit for receiving the flow of effluent therefrom, a plurality of pipes connected to the bowl for distributing the effluent outwardly therefrom, and at least one spray nozzle connected to each of this plurality of pipes, the nozzles being arranged so as to distribute the effluent evenly over the top of the aerobic bed.

Still further, the waste treatment assembly may further comprise means for sterilizing the flow of effluent so as to reduce the fecal colliform bacteria content thereof. Preferably, this may comprise a source of ultraviolet light, and an ultraviolet light transparent portion of the effluent conduit which is positioned in exposure to the source of ultraviolet light, so that the fecal colliform bacteria flowing through the transparent portion of the conduit are exposed to the ultraviolet light so as to be destroyed thereby. Preferably, this transparent portion of the conduit may comprise a portion of the conduit which is helically coiled about the source of ultraviolet light, so as to maximize the length of the conduit over which the bacteria flowing therethrough are exposed to the ultraviolet light. Also, the ultraviolet light source may preferably comprise an elongate fluorescent light fixture positioned within an open shaft which is surrounded by this helically coiled portion of the conduit.

These and other novel features and advantages of the present invention will become apparent from the following detailed description, wherein reference is made to the Figures in the accompanying drawings.

DETAILED DESCRIPTION

Figure 1:
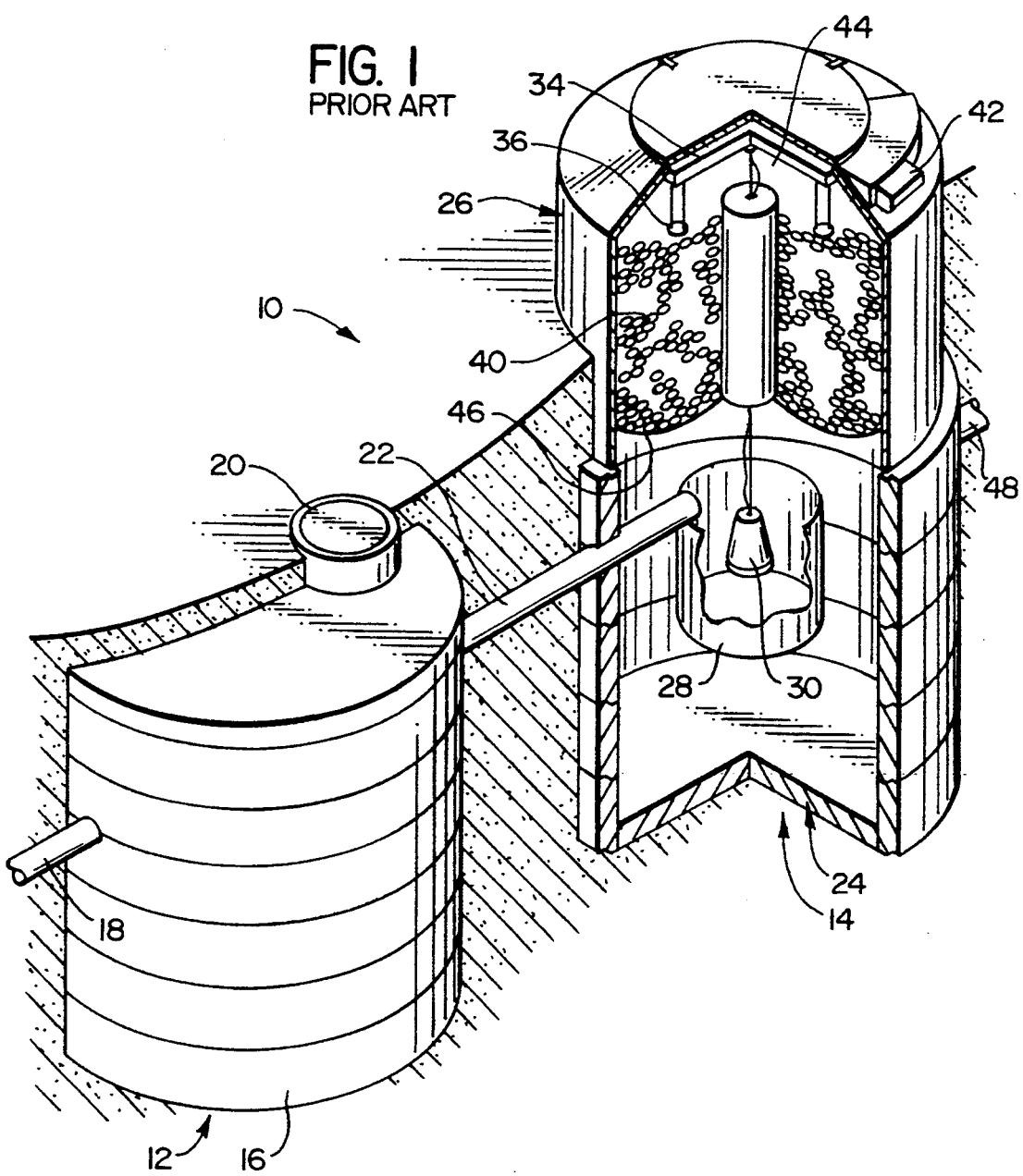
FIG. 1 is a perspective view of a prior art waste treatment system made up of a septic tank primary treatment unit and a trickle medium secondary treatment unit.
Figure 2:
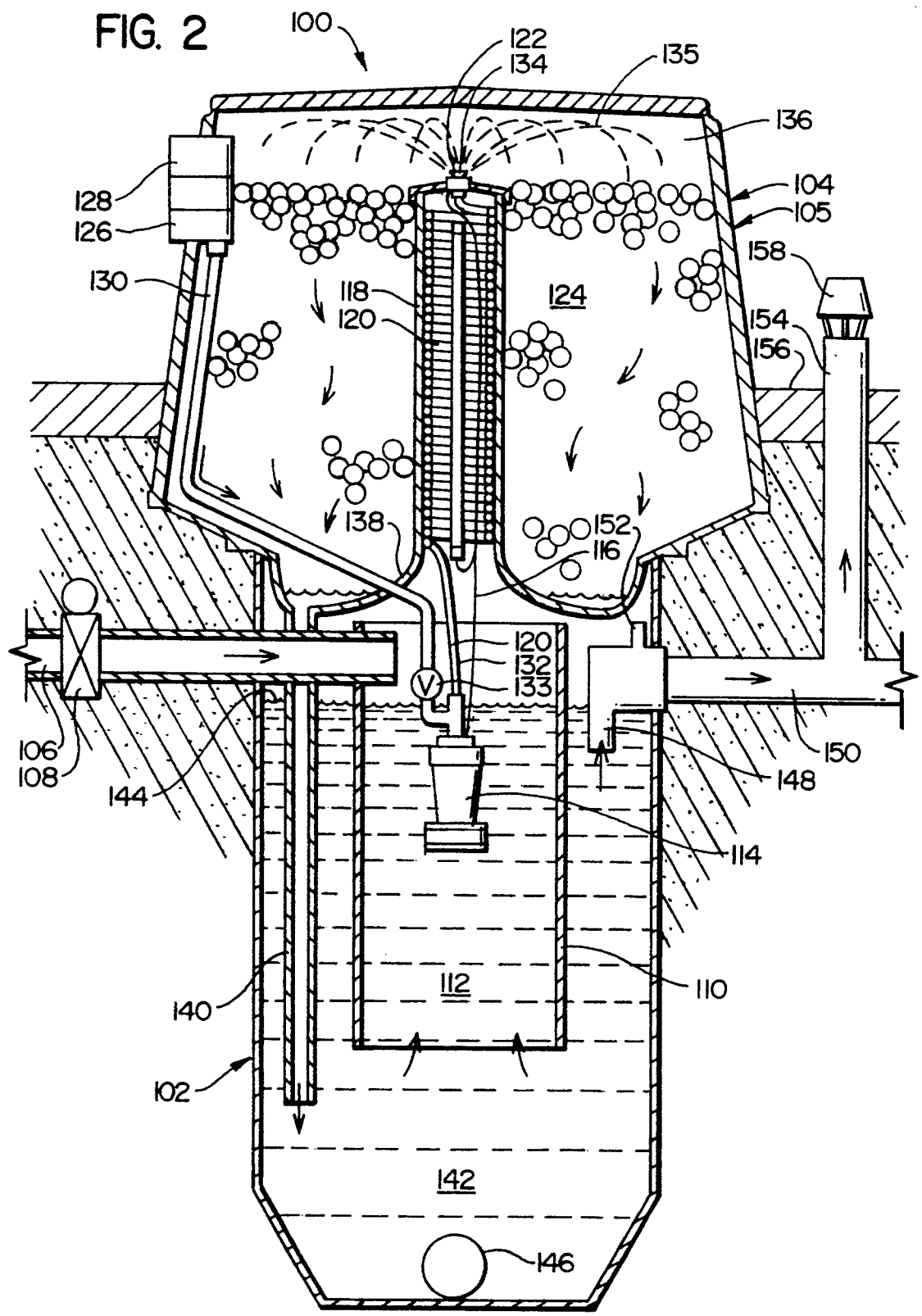
FIG. 2 is a side view of a cross section taken vertically through a secondary waste water treatment unit which incorporates the improvements of the present invention.

Turning then to FIG. 2, this shows a secondary treatment unit 100 which incorporates the improvements of the present invention. As before, this unit comprises generally a lower sump portion 102 and an upper aerobic treatment portion 104, these being contained within a housing 105 fabricated of suitable material, such as rotationally-molded polyethylene. In a manner essentially similar to that previously described, the effluent from the septic tank enters unit 100 through effluent line 106; an automatic cutoff valve 108 is installed in line 106 to prevent the flow of effluent in the event of electrical failure which would render the system inoperative. The effluent flow dumps into an open-ended baffle 110 in the sump to provide a reservoir of fluid 112. The submersible pump 114 is suspended in the reservoir inside the baffle, and power is supplied to this via an electrical cable 116 which extends down the central shaft 118 of the assembly. As will be described in greater detail below, the discharge from pump 114 passes upwardly through central shaft 118 via a coiled riser tube 120, and is discharged at the upper end of this from a spray nozzle 122. This distributes the liquid over the top the bed of trickle media 124, so that the effluent migrates downwardly through this, undergoing aerobic treatment by the biological slime which resides on the surfaces of the media. As previously described, the trickle media may comprise a bed of randomly packed elements, such as the disc-shaped elements or other types of random packing which are known to those skilled in the art, or this may be provided by sheets of rigid or flexible material, or even pebbles or rocks; an exemplary trickle media which is suitable for use in the present invention is the Model YTH 1120 Cascade Filter Pack, available from Mass Transfer International, 5583 Ridge Avenue, Cincinnati, Ohio.

Enhanced Aeration

It is a central aspect of the present invention to enhance the supply of oxygen to the organisms which make up the biological slime, and so increase their metabolic activity and the vigor of their growth. This is achieved in the present invention by (1) injecting a stream of air into the riser tube so that oxygen becomes diffused into the fluid as it flows therethrough, and (2) discharging the fluid from the riser tube in a spray so that it receives additional aeration before falling onto the surface of the trickle media bed. In the preferred embodiment which is illustrated in FIG. 2, the air is injected into the riser tube by means of a pump 126, which may be formed integrally with the blower fan mechanism 128. The compressed air outputted by the pump travels downwardly through the assembly in air line 130, and the lower end of this line is connected to the bottom end 132 of riser tube 120, so that the air enters the effluent flow at this point. The air is able to diffuse into the fluid over the full length of the riser tube; the coiled configuration of the riser tube 120 serves to enhance this by increasing the length of the flow path as the fluid travels up the central column 118. If desired, a diffuser nozzle or similar element may be installed at the air inlet into the tube so as to facilitate distribution of the air into the effluent stream. A check valve 133 is installed in air line 130 to prevent the liquid from backing up into this in the event that the air flow is interrupted.

The second feature which serves to enhance the aeration of the effluent is that this is discharged from the upper end of riser tube 120 through a nozzle 134 so that the resultant spray 135 passes upwardly through an air chamber 136 within the upper end of the housing before falling onto the surface of the trickle media bed. As this happens, the liquid in the spray absorbs additional oxygen from the air, this air supply being freshly charged by blower 128. A cap 137 is fitted over the top of column 118 so as to prevent the spray from falling back down through this. The spray nozzle 134 may be of any suitable configuration, although it is generally preferable that this be of a type which breaks the stream into a fine spray of droplets and evenly distributes this over the entire upper surface of the media bed; examples of nozzles which are suitable for use in this application include the Model RA Raindrop TM Hollow-Cone Nozzle which is available from Delavan Industrial Products Operation, 20 Delavan Drive, Lexington, Tenn. and the Model GG-W Full Cone Nozzle which is available from Spray Systems Company of Wheaton, Ill. Furthermore, there may be a single spray nozzle as shown in FIG. 2, or there may be two or more nozzles arranged to provide a desired spray pattern, as will be discussed below with reference to FIGS. 4-6.

The enhanced aeration of the liquid which is thus achieved promotes vigorous growth of the biological slime on the trickle medium. As a result, the aerobic metabolization of the organic materials is made more efficient, and also the slime is more resistant to being dislodged due to the shear force of the fluid flowing through the bed. Accordingly, the system can be operated on a continuous basis, which further increases efficiency and also reduces wear on the pump; this, in turn, makes it possible to use a smaller pump which is less expensive and requires less energy to operate.

Anaerobic Treatment

The aerobic metabolic reactions which take place in the upper trickle media bed may be summarized as follows. Firstly, compounds containing sugars, starches, carbohydrates, and simple crude proteins are metabolized by the microbes, producing carbon dioxide and water, as well as providing the constituents for new microbial cells and energy. This reaction may be expressed as:

$$-(C,4H) + 2O_2 \xrightarrow{\text{Enzymatic Oxidation}} CO_2 + 2H_2O + \text{Energy}$$

Additionally, reactions take place involving other components of the organic waste material, such as ammonia, sulfur-containing compounds, and compounds containing various metal ions. In particular, the very toxic ammonia which is present in the septic tank effluent in high levels is changed chemically by the aerobic processes as follows:

$$2NH_4 + 3O_2 \xrightarrow{\text{Enzymatic Oxidation}} 2NO_2 + 2H_2O + 4H^+ \text{ Energy}$$

$$2NO_2 + O_2 \longrightarrow 2NO_3 + \text{Energy}$$

As can be seen, ammonia which has entered the secondary treatment unit as the result of septic tank digestion, as well as the ammonium salts produced by microbial digestion, are oxidized first to nitrite, with water, hydrogen ions, and energy being released. The nitrite is then further oxidized to nitrate and more energy is released.

The liquid leaving the aerobic treatment zone is therefore rich in nitrates (i.e. $NO_3$), and for the reasons discussed above, it is undesirable for this to be discharged directly into the surface or ground water. However, denitrification of the nitrified material can be accomplished by means of a subsequent anaerobic step, and it is a feature of the present invention to facilitate this.

Accordingly, FIG. 2 shows that the bottom of the aerobic treatment chamber is provided with an annularly-dished collection pan 138. The nitrified material which has migrated downwardly through the trickle medium is collected in this, and is directed into a drain outlet which leads into a down tube 140. This extends downwardly from the aerobic treatment portion of the unit into the sump portion, to a lower end which is located well beneath the surface of the sump. Here, as indicated by the arrow in FIG. 2, the nitrified effluent is discharged into the lowermost layers 142 of the sump. Owing to the fact that these layers are remote from the upper surface 144 of the liquid in the sump, they constitute an anaerobic zone which is relatively deprived of oxygen so as to permit the anaerobic denitrification reactions to take place. As an incidental matter, this lower end of the sump is also provided with a desludging pipe 146 for periodic removal of accumulated materials.

The anaerobic denitrification which occurs in the bottom layers of the sump can be carried out by the same Pseudomonas bacteria which perform the aerobic functions in the upper chamber. These bacteria are facultative anaerobes which ordinarily prefer to respire using elemental oxygen, but when it is absent or reduced, they are able to respire using the oxygen which is found in nitrates. Accordingly, those bacteria which are "flushed" into the sump region when they ultimately slough off the trickle medium in the upper regions can supply the required anaerobic metabolic functions in the sump. Also, it may occur that there has been incomplete anaerobic decay of certain components of the waste stream from the septic tank, these also can receive treatment in the anaerobic zone of the sump.

After the liquid has been discharged into the sump through down tube 140, this resides in the anaerobic zone 142 for an extended period, and then is drawn upwardly through the open bottom of baffle 110 as the pump 114 withdraws the liquid from inside this in the directions indicated generally by the arrows in FIG. 2. The pump operates at a discharge rate which is significantly higher than the rate at which new effluent is entering the baffle from the septic tank, via line 106; for example, the pump may be configured to discharge at a volume rate on the order of five times greater than the volume rate at which fresh effluent is expected to flow through line 106. Consequently, liquid is constantly drawn upwardly through the bottom of the baffle from the lower regions of the sump, while the fresh effluent is contained within the baffle and is prevented from flowing downwardly through this before it is taken up by the pump for discharge into the aerobic treatment bed, thus avoiding the fresh effluent contaminating the anaerobic portion of the sump, especially with untreated ammonium. It will therefore be understood that the majority of the liquid in the sump will cycle repeatedly through the upper and lower regions of the unit, thus incorporating both aerobic and anaerobic steps in its treatment, while fresh effluent is added incrementally into the system.

AS the fresh effluent enters the unit, the liquid level in the sump rises, and that treated effluent which has diffused to the region adjacent overflow fitting 148 enters this and exits the unit through discharge line 150 by gravity flow, in the direction indicated generally by the arrows in FIG. 2. The intake for overflow fitting 148 is positioned relatively close to the surface of the liquid in the sump, and on the opposite side of the unit from the outlet opening of the down tube 140; through flow studies, it has been found that the material which has migrated or diffused to this location (i.e., that of the overflow fitting) will normally have received the maximum number of cycles through the treatment portions of the assembly, and therefore be most thoroughly treated in preparation for discharge.

The anaerobic denitrification process also results in the release of gaseous nitrogen (i.e., $N_2$), and much of this escapes at surface 144 of the liquid and into the cavity above this. From here, the gaseous nitrogen enters an intake portion or "snorkel" 152 of fitting 148 which extends above the surface of the effluent in the sump, as indicated by the arrow in FIG. 2. The nitrogen gas then proceeds through discharge line 140 along the upper portion thereof, until it reaches and enters a vertically extending vent pipe 154; this carries the gas above the surface 156 of the ground, and discharges this into the atmosphere through openings in a vent cap 158.

From the foregoing, it will be understood that the anaerobic zone of the treatment unit's sump is principally intended to provide an anaerobic denitrification phase as part of the aerobic/anaerobic treatment cycle through which the effluent passes, with the result that the presence of nitrates in the discharge is greatly reduced. However, in a back-up mode, this can also serve to provide additional anaerobic treatment of the septic tank effluent before this passes into the environment. As was noted above, a cutoff valve 108 may be installed in the effluent line 106 so as to cut off the flow through this in the event of power failure. In some embodiments, however, it may be preferred to delete this, so that even if there is a power failure which renders the submersible pump inoperative, the liquid can continue to flow through the system. In this case, the fresh effluent will be dumped into the top of baffle 110, and will flow downwardly through the open bottom of this into the anaerobic treatment zone in the sump, so as to receive additional anaerobic treatment therein which supplements that which was received in the septic tank. From here, the treated effluent will then flow upwardly to the discharge fitting 148 and out through line 150, in the manner previously described.

Fecal Colliform Sterilization

As was described above, the discharge from pump 114 is directed through a coiled riser tube 120, which extends upwardly through the interior of the central column 118 of the treatment unit. As can be seen more clearly in the enlarged view shown in FIG. 3, the helically coiled riser tube fits closely adjacent the inner wall of column 118, so that an open shaft 160 extends down the middle of this. An elongate fluorescent light fixture 170 is suspended down the middle of this shaft, with power being supplied to this by electrical cable 172; the lower end of this cable forms a pigtail 174 which supplies power to the sump pump 114. The fluorescent light 170 is selected to provide a source of ultraviolet (UV) light, and this is preferably of the type used as industrial, high-intensity UV light sources; of course, it will be understood that there are many other ultraviolet light sources which may be substituted for the fluorescent light which is illustrated. The coiled riser tube 120, in turn, is formed of a clear, UV transparent material, such as plastic tubing, and so the ultraviolet light freely passes through this and into the effluent which is flowing therein. As is known to those skilled in the art, fecal colliform bacteria are sensitive to UV light, and so this provides a highly effective agent for sterilization of the effluent; as the effluent is repeatedly cycled through this portion of the system, its fecal colliform count is greatly reduced, rendering this much safer for discharge into the environment. The coiled configuration of the riser tube 120 serves to greatly enhance this, inasmuch as it increases the length of the flow path relative to the height of the column 118, and so increases the duration of exposure of the effluent to the UV radiation emitted by fluorescent light 170.

Figure 3:
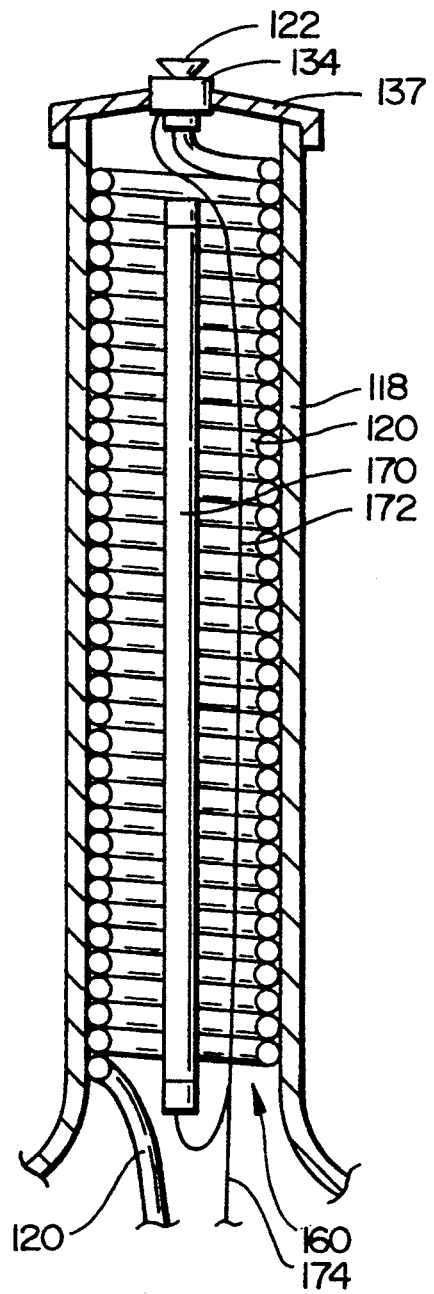
FIG. 3 is an enlarged view of the central shaft portion of the treatment unit shown in FIG. 2, this showing the ultraviolet light sterilization subassembly in greater detail.

As was noted above, the coiled riser tube 120 is preferably made of plastic tubing; it should be noted that most transparent plastic tubing which is found on the market is provided with inhibitors to UV light transmission, and so care should be taken to select an acrylic or other plastic tubing which is formulated to minimize attenuation of the UV light which is transmitted through it. In order to keep the coil from spreading apart when the assembly is lowered into column 118, elongate locking strips are provided to clip these together. As is shown in FIG. 3, these locking strips preferably comprise elongate strips or rails of semi-rigid, resilient plastic, with flared projections which extend from these between each of the adjacent coils; as the coils are slipped between these projections, they are "clipped" in place and held together adjacent one another.

The tubing itself may be sized as desired for any given flow rate, and in the embodiment which is illustrated, tubing having a diameter of roughly 1-1¼ inches has been found eminently suitable.

Multiple Head Sprayer Assembly

Figure 4:
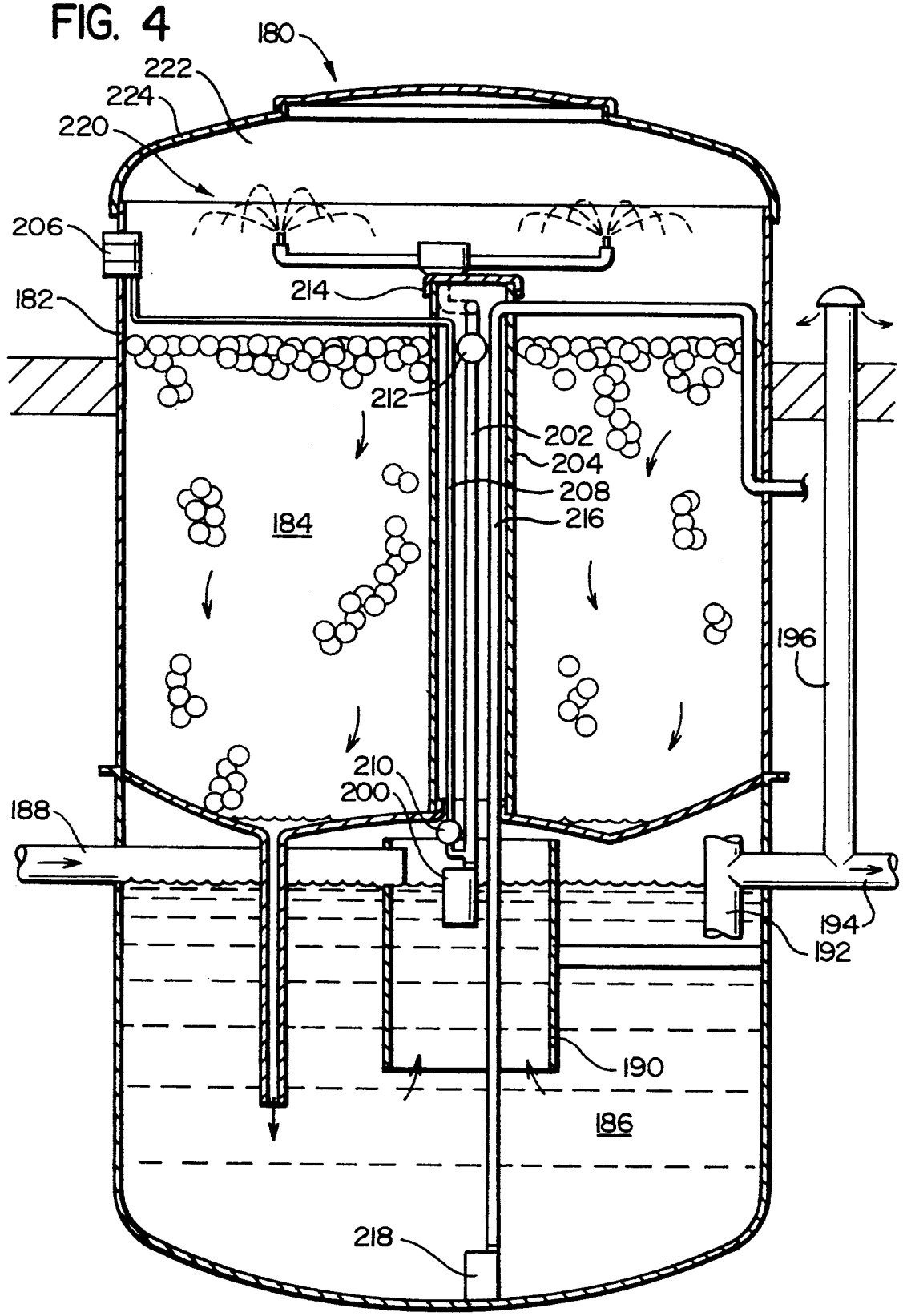
FIG. 4 is a side view of a cross section taken vertically through a second embodiment of secondary waste water treatment unit which incorporates the present invention, this having a multiple head sprayer assembly for distributing the effluent over the media bed.

FIG. 4 illustrates a second embodiment of the present invention. This shows a secondary treatment unit 180 which is significantly larger than that shown in FIG. 2, but which is generally similar in its overall configuration. Accordingly, there is a generally cylindrical housing 182 which contains an upper aerobic treatment bed 184 and a lower sump 186; apart from size, these are substantially identical to the corresponding features of the embodiment described above, and so will not be described in detail here. Similarly, there is also an inflow line 188 for carrying effluent from the septic tank, and this discharges into an open-ended baffle 190 in the manner previously described. At the outlet side there is an overflow fitting 192 for receiving the liquid and gas from the sump, and this leads into a drain line 194, the gas being bled off through a vent pipe 196.

Also as before, there is a submersible pump 200 which draws the liquid from within the baffle and discharges this through a riser tube 202 which extends upwardly through the column 204 of the assembly; the air is likewise supplied at the base of the riser pipe from air pump assembly 206, via air line 208 and check valve 210. The particular embodiment which is illustrated does not incorporate the ultraviolet light sterilization section described above, and so riser tube 202 is simply a straight, vertical member. At the upper end of this, there is a backflow preventer valve 212, and a multiple head sprayer assembly 220. The liquid discharged through this forms a spray which passes through the air-filled cavity 222 which is defined between the upper surface of the trickle media bed and the domed cover 224 which encloses the upper end of the cylindrical housing. In essentially the same manner as previously described, this cavity is charged by an air pump assembly 206, and so the effluent in the spray receives additional aeration before falling onto the surface of the media bed for aerobic treatment. As before, the upper end of the column is closed by a cap 214 which prevents the spray from falling back down through this.

In the embodiment which is illustrated, the desludging line 216 also extends up through the column 204, generally parallel to the riser tube 202; this receives and discharges the sludge which is pumped out of the bottom of the sump 186 by desludging pump 218. This arrangement is often advantageous in that it preserves the integrity of the sump, being that it is not necessary to run the desludging line out through the wall of this.

Figure 5:
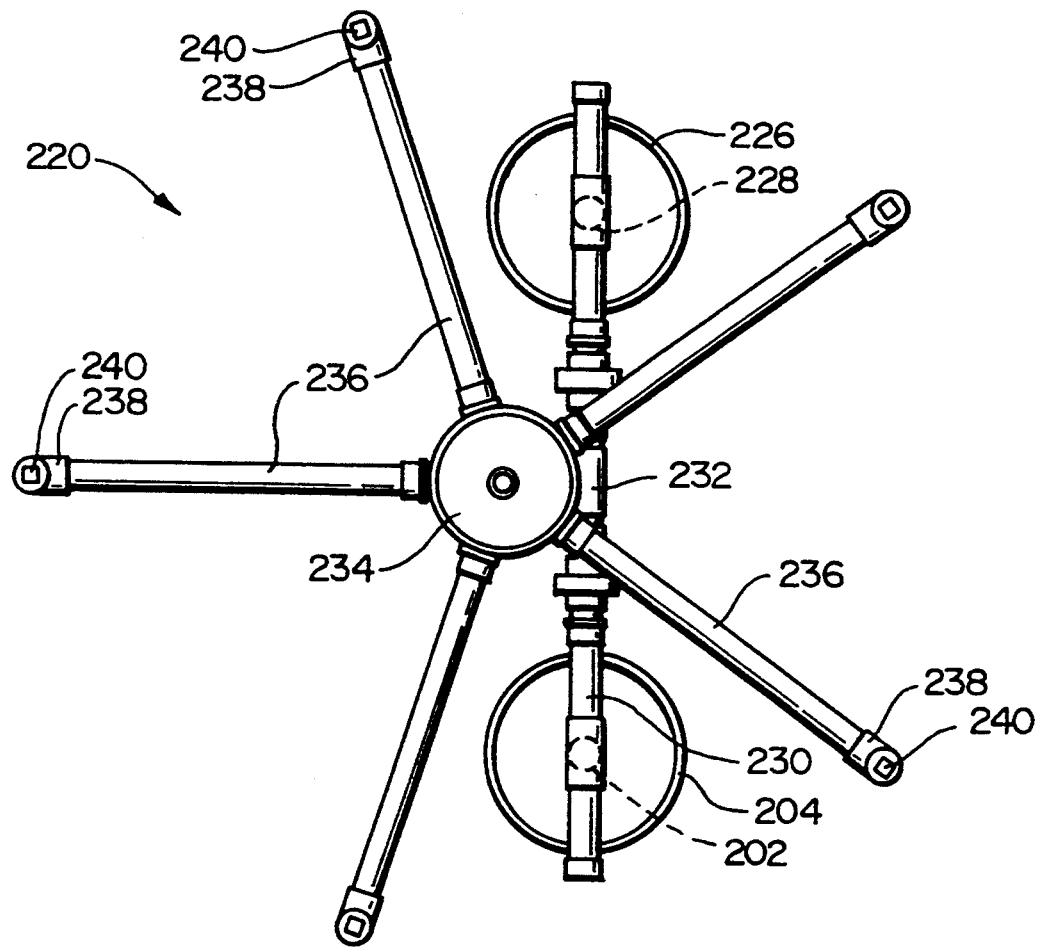
FIG. 5 is a top plan view of the sprayer assembly of the treatment unit shown of FIG. 4.

FIG. 5 shows the multi-head spray assembly 220 in greater detail. Firstly, it will be observed that there are two column members, 204 and 226, each associated with its own pump and riser assembly; this is advantageous in the embodiment which is illustrated, owing both to the large size of the treatment unit (e.g., 10–12 feet in diameter) and also the fact that this makes it possible to have a pump in standby in case the other fails or additional pumping capacity is needed. The backflow preventer valve which is associated with each riser tube prevents the fluid flow from passing back down through the non-operating pump. The two riser tubes 202 and 228 are interconnected by a header pipe 230 which extends across their upper ends. There is a "T" fitting 232 in the middle of the header pipe, and this is connected to a cylindrical distribution bowl 234 so as to direct the fluid flow from either riser pipe into this. A plurality of horizontal pipes 236 extend from the distribution bowl in a radial array, there being five of these pipes in the embodiment which is illustrated. There is an elbow fitting 238 at the end of each of these horizontal pipes so as to direct the flow to a vertically aligned nozzle 240.

Figure 6:
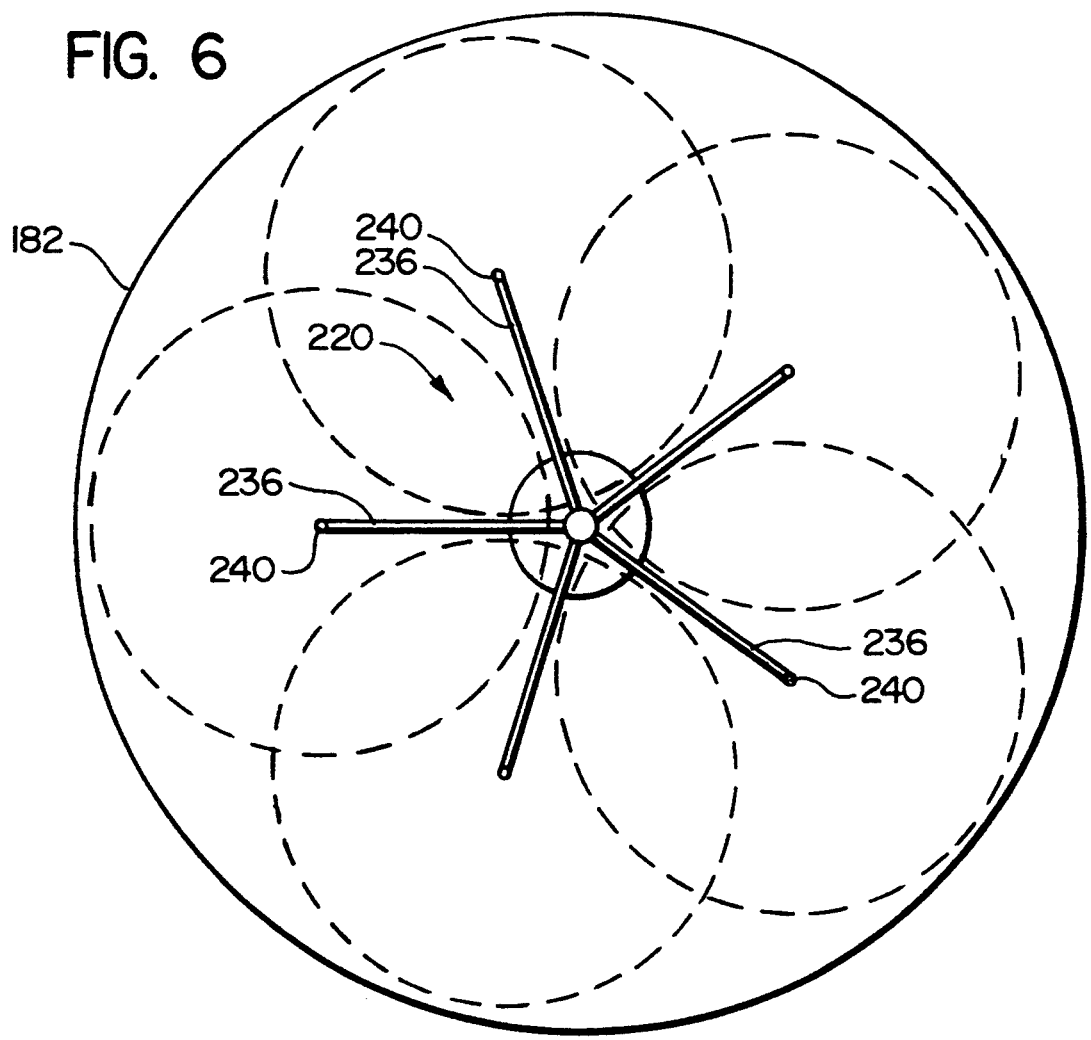
FIG. 6 is a plan view showing the distribution pattern of the multiple head sprayer assembly of FIG. 5.

Each of these nozzles 240 is essentially identical to the single nozzle described above. Accordingly, each of these directs an umbrella-shaped spray pattern upwardly into the air-filled chamber 222 so that the effluent receives additional aeration. FIG. 6 illustrates the spray pattern which is thus generated by the multiple head array. As can be seen, the circular patterns produced around the nozzles extend completely around the central distribution bowl and overlap at their edges, and the outer extremities of the patterns fall close to the cylindrical outer wall of housing 182. The multiple head sprayer assembly 220 consequently provides thorough and even distribution of the effluent across the top of the underlying media bed. Furthermore, the multiple head sprayer arrangement makes it possible to break a relatively large flow of effluent into a fine spray so as to ensure that this receives effective aeration.

Since many possible embodiments may be made of the invention without departing from the scope thereof, it is to be understood that all matter herein set forth or shown in the accompanying drawings is illustrative and not in a limiting sense.

What is claimed is:

1. A biological waste treatment assembly for use between a septic tank and a drain field, said waste treatment assembly comprising:
   an upper bed portion for aerobic biological treatment of an effluent from said septic tank;
   a lower sump portion for holding said effluent in a reservoir, said reservoir having a lower, relatively oxygen-free layer comprising means for aerobic biological treatment;
   pump means for delivering a flow of said effluent to an upper portion of said bed so that said effluent migrates through said bed portion and undergoes aerobic biological treatment therein;
   means for collecting said effluent which has migrated through said aerobic bed portion; and
   means for draining said effluent which has been collected from said bed portion directly to said oxygen-free lower layer of said reservoir so that said effluent undergoes anaerobic biological treatment therein;
   whereby said effluent passes sequentially through aerobic and then anaerobic biological treatment in said assembly prior to entering said drain field.

2. The waste treatment assembly of claim 1, wherein said means for collecting said effluent comprises:
   a drain pan mounted beneath said upper bed portion of said assembly so as to receive effluent which has migrated downwardly therethrough.

3. The waste treatment assembly of claim 2, wherein said means for draining said effluent to said oxygen-free lower layer of said reservoir comprises:
   a drain conduit having an upper end in fluid communication with said drain pan and a lower end in fluid communication with said lower layer of said reservoir.

4. The waste treatment assembly of claim 3, further comprising:
   means for discharging said effluent from said assembly after said effluent has undergone at least one cycle through aerobic treatment in said upper bed portion of said assembly and anaerobic treatment in said reservoir of said assembly.

5. The waste treatment assembly of claim 1, further comprising:
   means for aerating said flow of effluent from said pump means prior to said flow entering said aerobic upper bed portion of said assembly.

6. The waste treatment assembly of claim 5, wherein said pump means for delivering said flow of effluent to said bed portion of said assembly comprises:
   a pump for drawing said effluent from said reservoir in said sump; and
   a conduit for conveying said flow of effluent from said pump to said upper portion of said aerobic bed portion of said assembly.

7. The waste treatment assembly of claim 6, wherein said means for aerating said flow of effluent from said pump means comprises:
   means for injecting air into said conduit from said pump so as to aerate said flow of effluent therein.

8. The waste treatment assembly of claim 7, wherein said means for injecting air into said conduit comprises:
   an air pump; and
   an air line having an inlet end connected to said air pump and an outlet end connected to said conduit for said effluent.

9. The waste treatment assembly of claim 8, wherein said outlet end of said air line is connected to said conduit closely adjacent said pump, so that said air diffuses into said effluent over substantially the entire length of said conduit.

10. The waste treatment assembly of claim 7, wherein said means for aerating said flow of effluent further comprises:
    an air chamber formed above said upper bed portion of said assembly; and
    a spray nozzle assembly connected to said conduit for discharging said flow of effluent in a spray through said air chamber, so that said effluent receives additional aeration therein prior to falling onto said bed portion of said assembly.

11. The waste treatment assembly of claim 10, wherein said spray nozzle assembly comprises:
    a single spray nozzle mounted to an upper end of said conduit for receiving said flow of effluent therefrom.

12. The waste treatment assembly of claim 10, wherein said spray nozzle assembly comprises:
    a distribution bowl mounted to an upper end of said conduit for receiving said flow of effluent therefrom;
    a plurality of pipes connected to said bowl for distributing said effluent outwardly therefrom; and
    at least one spray nozzle connected to each of said plurality of pipes, said nozzles being arranged so as to distribute said effluent evenly over said upper bed portion of said assembly.

13. The waste treatment assembly of claim 1, further comprising:
    means for sterilizing said flow of effluent so as to reduce the fecal colliform bacteria content thereof.

14. The waste treatment assembly of claim 13, wherein said means for delivering said flow of effluent to said bed portion of said assembly comprises:
- a pump for drawing said effluent from said reservoir in said sump; and
- a conduit for conveying said flow of effluent from said pump to said upper portion of said aerobic bed portion of said assembly.

15. The waste treatment assembly of claim 14, wherein said means for sterilizing said flow of effluent comprises:
- a source of ultraviolet light; and
- an ultraviolet light transparent portion of said conduit positioned in exposure to said source of ultraviolet light, so that fecal colliform bacteria flowing through said transparent portion of said conduit are exposed to said ultraviolet light so as to be destroyed thereby.

16. The waste treatment assembly of claim 15, wherein said transparent portion of said conduit comprises:
- a portion of said conduit which is helically coiled about said source of ultraviolet light, so as to maximize the length of said conduit over which said bacteria flowing therethrough are exposed to said ultraviolet light.

17. The waste treatment assembly of claim 16, wherein said source of light comprises:
- an elongate fluorescent light fixture positioned within an open shaft which is surrounded by said helically coiled portion of said conduit.

* * * * *